Oct. 18, 1932.  O. BEHIMER  1,883,850

PROCESS FOR MAKING GASOLINE

Original Filed Nov. 21, 1918

Patented Oct. 18, 1932

1,883,850

UNITED STATES PATENT OFFICE

OTTO BEHIMER, OF PORT ARTHUR, TEXAS, ASSIGNOR, BY MESNE ASSIGNMENTS, TO THE TEXAS COMPANY, OF NEW YORK, N. Y., A CORPORATION OF DELAWARE

PROCESS FOR MAKING GASOLINE

Original application filed November 21, 1918, Serial No. 263,562, and in Canada December 3, 1921. Divided and this application filed April 6, 1923. Serial No. 630,242.

This invention relates to methods of making condensable light oils, such as gasoline. More particularly it relates to certain novel improvements in the cracking of hydrocarbons whereby higher boiling hydrocarbons are decomposed into those of lower boiling point.

This application is a division of my copending application, Serial No. 263,562, filed November 21, 1918.

In prior methods of cracking hydrocarbon oils, considerable difficulty has been experienced on account of carbon formations, which occur on the sides of tubes and stills exposed to the heat required to carry on the cracking operation.

It is a broad novel feature of the herein disclosed process that substantially all of the cracking operation occurs in a vessel to which no external heat is applied, except at such times and in such quantities as are necessary to compensate for heat losses, the oil prior to its introduction to such vessel having been subjected to a high degree of cracking heat and the excess heat of the oil itself being used to effect its own decomposition. As a consequence, I avoid substantial carbon formations of the destructive character which have proved such an impediment to prior systems. The removal of the cracking operation from the heating zone also reduces the danger from fires such as frequently occur where cracking is carried on in highly heated stills and coils exposed to direct heat.

More specially my process preferably embodies a novel cyclic system in which a circuit of oil is constantly maintained under varying liquid and vapor phases. The oil to be treated on entering this circuit is subjected to a high degree of heat, but the time element is so controlled with respect thereto that there is comparatively little decomposition and deposition of carbon while it is exposed to this external heat, the oil being rapidly removed from the heating zone and conducted to the cracking zone, where without necessarily being subjected to additional heat, it undergoes a molecular decomposition whereby carbon and light products are formed and liberated. It will be understood that oil cracking or conversion is dependent not only upon the relative conditions of pressure and temperature but also upon the time element with respect thereto, that is,—the necessary pressure and temperature must be maintained for a sufficient period of time to enable the molecular decomposition or conversion to take place. According to the present invention, this time factor is so controlled, by regulating the rate of heating the oil passing through the heating zone that the temperature thereof is progressively raised in transit and reaches the desired cracking temperature near the end of the heating coil at about the time or a little before the oil emerges therefrom. Thus, although the oil is subjected to cracking heats in the heating zone, this temperature is attained only just previous to the exit of the oil therefrom, and therefore, the oil leaves the heating coil before any substantial decomposition and incident deposition of carbon takes place. Subsequently, the highly heated oil in a state of incipient decomposition, is delivered to the cracking zone, where the desired temperature and pressure conditions are continuously sustained and the cracking of the oil and the incident decomposition of carbon are effected. The bulk of the carbon is removed from the circuit by withdrawing from the cracking zone, portions of the residual oil. Although the process, in its broad conception, is complete at this stage of the operation, the light products preferably continue the cycle, leaving the cracking zone in the form of vapor and gas. These vapors and gases are then subjected to a reduction in temperature, whereby the heavier constituents thereof, such as kerosene, are condensed. The condensate preferably is combined with the charging oil entering the heating zone, thus completing the cycle. The constituents of the desired volatility are removed from the circuit and condensed. The outlets from the circuit are so controlled that the entire system is maintained under a pressure sufficient to insure the desired molecular transformation.

My process is to be distinguished from those of the prior art, in which a circuit of liquid residuum is kept in circulation. When such oil is kept in circulation, considerable quantities of carbon are formed, owing to the readiness with which this type of oil carbonizes when exposed to high temperatures, the carbon forming in fine particles in the oil, and wherever it comes in contact with heated metal surfaces, it attaches itself thereto and builds up deposits, which often cause the choking of tubes and coils. It also crystalizes the metal surfaces, thereby decreasing the tensile strength of the metal and causing the bulging and breaking of such surfaces. Any residual oil resulting from the cracking operation will necessarily contain a considerable amount of heavy polymerization products and carbon held in suspension in the oil, and to circulate such a residue through heated tubes is to continually pass into or produce in such tubes a large amount of free carbon. In my system, I do not circulate a residuum, but instead keep the residual oil removed from the application of external heat and withdraw the heavier portions thereof, which contain the bulk of the carbon, from the cycle at the cracking zone, and continue the cycle by means of the vapor generated, which contains the condensable product desired and also certain heavier vaporous constituents which are used to complete the cycle. By removing the heavier residuum from the cycle, I keep the circuit free from this source of carbon formation, and since I conduct substantially all of the cracking in a vessel to which either no external heat is applied or only a small quantity of heat is applied to maintain the requisite temperature conditions, I am thus able to effectively remove the carbon formed.

In cracking oil for gasoline, there is generally formed a considerable quantity of vapors heavier than gasoline, which may be generally designated by the term, kerosene. I preferably employ these heavier vapors as a carrier for the lighter vapors; they assist in maintaining a current of vapor by which the gasoline is removed from the cracking zone to a separator where the kerosene vapors are condensed and removed from the gasoline vapors which pass on to the condenser. The kerosene condensate, preferably at a temperature, not materially below its boiling point, is injected or otherwise suitably forced under mechanical pressure into the heavy oil charge entering and flowing through the heating tubes whereby a foamy agitated mixture is produced by the acceleration of the circulation in the heating tubes resulting from the increased volume of oil therein, thereby preventing the settling and flow of the heavier portions of the oil along the bottom of the highly heated tubes and the consequent local overheating and carbonization of the oil, thus keeping the tubes substantially free from any slight carbon formations. These kerosene constituents are an excellent mechanical conductor of heat, and there is thus produced a heat cycle which materially assists in maintaining the proper temperatures in the heating and cracking zones. By maintaining these bodies in constant circulation, the kerosene constituents, which under existing methods have been found so difficult to decompose into lighter products, are, in my system, ultimately reduced to gasoline.

I have devised certain novel apparatus which is adapted for carrying out my process, and illustrate the preferred form thereof in the drawing in which.

It will be understood that other apparatus besides that illustrated may be used in carrying out my process.

Figures 1, 2:
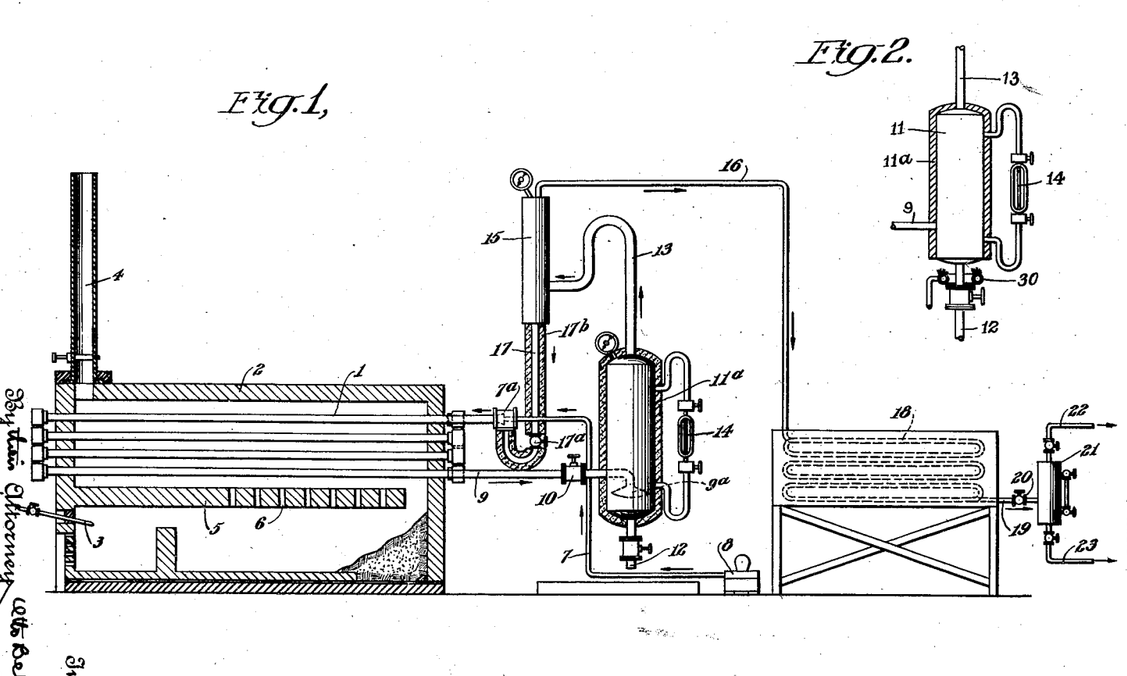
Figure 1 is a diagrammatic elevation of said apparatus.
Figure 2 is a diagrammatic view of a modified cracking drum which may be substituted for that of Figure 1.

Referring to Fig. 1 of the illustrative drawing, a tubular heating coil 1 is located in a furnace 2, having a burner 3 and a stack 4. As shown for illustrative purposes, the coil 1 comprises a plurality of horizontally disposed rows of tubes extending through the furnace and placed the one above the other. The adjacent ends of each alternate pair of tubes in each horizontal row are conveniently connected together by horizontally positioned return bends or fittings to form horizontal coils. The several horizontal coils thus arranged are conveniently connected together at their right-hand ends by vertically disposed return bends or fittings, as shown in Fig. 1, to form a single elongated and continuous heating coil through which the oil flows and is heated to the required degree. This coil is of extended length and restricted cross-section and has a relatively large and effective heating surface whereby the stream of oil passing therethrough is enabled to efficiently absorb heat and reach a high temperature with rapidity. A checkered brick baffle 5 having openings 6 may serve to distribute the heat evenly over the coil. A fresh oil charging line 7, having a jet or injector 7$^a$, extends to a pump 8, which is connected to a suitable source of oil supply (not shown). The pipe 9, having a valve 10, extends from the heating coil 1 to an enlarged cracking drum or chamber 11, within which it may terminate in a distributor 9$^a$. This distributor 9$^a$ may be of any suitable form to thoroughly distribute and diffuse the charging oil throughout the body of oil in the drum whereby an intimate contact of the highly heated charging oil with the body of oil in the drum is effected. The cracking drum is preferably provided with a jacket 11$^a$ of suitable insulating material to protect it against heat radiation and is equipped with a valved draw-off 12, a vapor outlet 13, and an oil gauge 14. The vapor outlet 13 extends to a separator 15, having a vapor outlet 16, and a condensate outlet 17. The vapor line 16 terminates in a water-cooled condenser coil 18, having an outlet 19 equipped with a regulatable pressure valve 20. If desired the valve 20 may be placed in the vapor line 16 but I prefer to maintain the pressure in the heating coil, cracking drum and separator through the condenser. The outlet 19 terminates in a collecting tank 21, having a valved gas outlet 22 and a valved distillate outlet 23. The condensate line 17, which is preferably insulated, as indicated at 17$^b$ is equipped with a valve 17$^a$ and is connected to the charging line 7 at the jet 7$^a$.

In conducting the process with the apparatus illustrated, the oil to be treated is forced through the charging line 7 under considerable pressure, and is rapidly flowed through the heating coil 1, where it is heated to the desired cracking temperature. Preferably this temperature is somewhat higher than the temperature at which it is desired to conduct the cracking operation and may or may not result in substantial vaporization. The oil on being forced through the coil acquires a high cracking temperature, but on account of the rapidity of its flow, decomposition is only in the incipient stages when the oil is discharged through the pipe 9 into the heat insulated cracking drum 11 where a constant body of oil is maintained at a cracking temperature under pressure. The distributor 9$^a$, if employed serves to discharge the oil into the cracking drum in a wide stream, thus thoroughly mixing the hot oil with the liquid body of oil maintained in the drum and diffusing the heat therethrough. This heat diffusion is materially aided by using a distributor with serrated edges. The rapid flow of the oil through the coil where it is closely confined is here suddenly retarded, as the oil enters the drum which is of ample volume. Thus the excess heat of the oil operates to maintain the body of oil at the desired cracking temperature and molecular decomposition and distillation are carried on vigorously, the higher boiling hydrocarbons continually breaking up into hydrocarbons of lower boiling point. The vapors and gas generated gather in the upper part of the cracking drum and pass out through the vapor outlet 13 to the separator 15, where there is effected a separation of hydrocarbons of desired volatility from those of less volatility. The hydrocarbons of the desired volatility pass out through the vapor line 16, by which they are conducted to the condenser 18, where they are condensed, and the condensed distillate is either intermittently or preferably continuously allowed to run into the collecting tank 21.

The temperature in the air condenser 15 is such that the less volatile hydrocarbons are condensed and dropped into the conduit 17, by which they are conducted while still hot to the jet in the charging line or other suitable forced or applied mechanical pressure device for forcing the condensate into the charging stream. The separator is preferably somewhat elevated so as to give a considerable head of liquid in the pipe 17, which preferably contains a U bend, as illustrated, in order to form a liquid seal therein. This head of liquid, together with the high pressure at which the oil in the charging line passes the jet, this pressure being ordinarily from 50 to 100 pounds higher than the pressure in the drum, insures that the condensate shall be constantly and positively drawn into the charging line and forced under applied mechanical pressure into the coil 1. The introduction of this hot condensate into the charging line increases the volume of oil in the heating coil and thereby accelerating the flow therein and producing a foamy mixture so that local overheating is prevented and the coil is kept substantially free from any slight carbon formations. This condensate consists in a type of hydrocarbons which when decomposed does not yield any great amount of carbon so that the oil charge is constantly being diluted with oil capable of being decomposed into lighter products without the production of large amounts of carbon. This condensate reaches the jet in a heated condition, preferably at a temperature not materially below its boiling point, so as to heat the charge of oil entering the heating coil. The heat cycle formed by the kerosene constituents contributes to the maintenance of the proper temperatures in the heating coil and the cracking drum. By injecting or otherwise suitably forcing this condensate under applied mechanical pressure into the heating coil I increase the volume of oil flowing therein without increasing the total amount of oil charged into the system at any given time.

A considerable pressure is maintained throughout the system, which pressure is regulated by means of the valve 20 or the valve on the gas outlet 22. The pressure used varies with the character of the oil operated on and the character of the product desired. Ordinarily the decomposition in the cracking drum is carried on under a pressure of from 100 to 400 pounds. In utilizing oils of the type commonly employed for decomposition into products of the nature of gasoline a temperature in the drum 11 of from 700° F. to 850° with a temperature in the coil 1 of from 700° F. to 950° F. is ordinarily used. For example, in cracking a paraffin base gas oil of a Baumé gravity of about 34°, a temperature of 850° F. in the coil and of 775° F. in the drum with a pressure of approximately 200 pounds has been used to advantage.

The oil to be decomposed is constantly forced into the heating coil thereby causing a steady stream of heated oil to enter the cracking chamber. The residuum is with-drawn preferably at such a rate that there is maintained a constant body of oil in the cracking zone.

It is desirable to equip the apparatus with the valves 10 and 17ª so that in case there is a break in the heating coil the effect of any fire resulting may be localized by closing said valves, whereby the bulk of oil in the system will be retained in the cracking drum 11. It is understood that in the normal operation of the process these valves are open.

Auxiliary heat may be supplied to the cracking drum in any suitable manner if desired, and a convenient method of providing this auxiliary heat is, as shown in Fig. 2, to insulate only the upper part of the drum and apply heat at a moderate temperature or in a relatively small quantity from any suitable heater such as is designated 30. The lower portion of this drum may be enclosed in a furnace. In the early stages of a run, since there is no danger of overheating a carbon-free surface, the drum may be heated freely until the necessary heat cycle has been generated and decomposition has begun. For this reason the arrangement of Fig. 2 possesses certain advantages over that of Fig. 1. But when decomposition begins, with a consequent deposition of carbon, the heat must be reduced, as otherwise the carbon would accumulate on the hot surfaces and build up tenacious formations thereon, thus preventing the effectual removal of the carbon and asphaltic bodies. As the run continues only a moderate heat is applied, sufficient only to offset the loss of heat due to radiation and distillation. If desired the drum may be heated by means of waste heat from the furnace 2 or in any other suitable manner.

The product obtained by the herein disclosed process is, for a cracked product, remarkably sweet, in other words, low in unsaturated compounds.

It is understood that I use the terms gasoline and kerosene in this application by way of example and that these terms are taken as types of other similar distillates which may be produced by my process. I use the term gasoline as an example of the volatile product desired which under the temperatures and pressures used is a vapor in the separator 15 and is condensable in the cooling coil 18. I use the term kerosene as an example of those constituents which under the temperatures and pressures used is a vapor in the vapor line 13 but is condensable in the separator 15. It is to be noted that the gravity and boiling point of the products which will condense in the separator 15 depends upon the temperature therein under the pressures used.

Although for illustrative purposes the invention has been shown and described in connection with apparatus of more or less specific details of construction, arrangement and location of parts, and as embodying in its mode of operation a certain series and sequence of somewhat definite steps and operating conditions, it will be understood that many of the objects and advantages of the invention may be obtained, to a greater or less extent, through the employment of apparatus of modified character or, in fact, through variations or, in some cases, omissions, of certain of the component steps, without departing from the spirit and scope of the invention.

What I claim is:

1. The continuous method of converting hydrocarbons which comprises forcing charging oil under superatmospheric pressure through a heating coil and regulating the heating therein so that it is raised to a cracking temperature, removing said oil from the coil before any material decomposition sets in and conducting it to a vessel maintained under superatmospheric pressure and not subjected to external heat where cracking is carried on by means of the heat contained in the oil, removing from the cracking zone residuum and vapors formed, separating the less volatile constituents of the latter and forcing them into the charging oil entering the heating coil.

2. The process of converting hydrocarbon oil which comprises continuously forcing oil through a heating coil at a rapid rate of flow, continuously removing said oil from the coil before material cracking takes place and introducing it into a body of oil while in its heated condition to maintain said body of oil at a temperature sufficient for decomposition without depending upon the application of other external heat thereto, removing residuum and vapors formed, separating out the heavier vapors as a condensate and continuously forcing it under maintained mechanical pressure into the heating coil, while maintaining a pressure of substantially 100 to 500 pounds throughout the system.

3. The process of converting hydrocarbon oil which comprises passing oil once through a heating coil where the oil acquires a high cracking temperature, continuously removing said oil from the coil and introducing it into a substantially constant body of oil whereby said body of oil is maintained at a somewhat lower cracking temperature and is subjected to decomposition, removing from said body of oil residual bodies and vapors formed, separating out the heavier of said vapors as a condensate and continuously forcing it free of residual oil and under maintained mechanical pressure into the heating coil, while maintaining a pressure of substantially 100 to 500 pounds throughout the system and continuously supplying charging stock to the process.

4. A process of oil conversion that comprises maintaining a body of oil under superatmospheric pressure at a cracking temperature in a drum by continuously supplying oil at a comparatively high cracking temperature but substantially free from decomposition into the body of oil in said drum to be cracked therein, preventing loss of heat from said drum, distilling and condensing the gasoline and kerosene fractions, separating out the kerosene fractions and returning them under maintained mechanically applied pressure and free of residual oil to the incoming supply.

5. A process of oil conversion that comprises maintaining a liquid body of oil under superatmospheric pressure at a cracking temperature in an unheated drum, insulating the drum against loss of heat and supplying unconverted oil to the drum through a highly heated coil, the rate at which the oil is heated in the coil being regulated to avoid substantial decomposition of the oil therein, withdrawing vapors from said drum, forcibly returning the heavier constituents of said vapors in liquid form and under maintained mechanical pressure to the coil, condensing the lighter constituents of said vapors under superatmospheric pressure and preventing the return of residual oil to said coil.

6. A process of oil conversion that comprises charging oil at high speed through a coil into a cracking drum, applying high temperature heat to the coil to raise the temperature of the oil so that it is delivered to the drum at a cracking temperature but without substantial decomposition, maintaining a body of liquid oil under superatmospheric pressure and at a cracking temperature in said drum to produce decomposition thereof, continuously withdrawing the vapors from the drum, separating the kerosene-like constituents from the lighter vapors, returning the kerosene-like constituents by applied mechanical pressure to the coil for passage therethrough with the charge, condensing the lighter vapors, and preventing the return of residual oil to said coil.

7. A process of oil conversion that comprises passing charging oil rapidly in a single passage through a highly heated coil and into a cracking chamber maintained under superatmospheric pressure to which no high temperature heat is applied during the cracking operation, withdrawing residue from said chamber, passing the vapors from the chamber into a separator, forcibly returning the heavier constituents of said vapors while under maintained pressure and without material drop in temperature, with the fresh charging oil into the coil, and preventing the return of residue to said coil.

8. The continuous method of cracking hydrocarbon oils which comprises charging a stream of oil into a cracking still to maintain a body of oil therein, maintaining the oil therein under superatmospheric pressure and at a cracking temperature, removing the evolved vapors, separating out the heavier constituents thereof and cyclically returning them to the still for further treatment by positively forcing them into the stream of charging oil being supplied to the still.

9. The process of oil conversion that comprises maintaining a substantially constant body of oil in a still at a cracking temperature and superatmospheric pressure and under distillation, by continuously supplying oil thereto through a heating coil in which the oil is raised to a comparatively high cracking temperature in a single passage, separating out the heavier distillation products in the form of a hot condensate and forcing it while still hot and under maintained mechanical pressure into the coil for retreatment, preventing the return of residual oil to the coil and continuously supplying charging stock to the process.

10. A process of oil conversion that comprises passing the oil once through an extended heating zone of restricted cross-section where it is raised to a cracking temperature and thence into a cracking and distilling zone where a body of liquid oil is maintained, decomposed and distilled, separating the heavier constituents of the evolved vapors and without substantial drop of temperature or pressure, forcibly returning them to the heating zone for retreatment, removing residue from the cracking zone while preventing recirculation of residue through the heating zone, and maintaining superatmospheric pressure through the heating and cracking zones.

11. A process of oil conversion that comprises passing the oil through an extended heating zone of restricted cross-section where it is heated to a cracking temperature, delivering the heated oil into an unheated cracking and distilling zone, separating the heavier constituents of the evolved vapors and returning them without substantial drop in pressure or temperature under mechanical pressure to the heating zone for retreatment, preventing recirculation of residue through the heating zone, maintaining superatmospheric pressure through the heating and cracking zones and continuously supplying charging stock to the process.

12. A process of oil conversion that comprises passing the oil once through a heating coil where it is raised to a cracking temperature and into a drum where a substantially constant body of liquid oil is maintained and vapors evolved, separating the heavier constituents of the evolved vapors and returning them while still hot and without substantial drop in pressure under mechanical pressure to the heating coil for retreatment, removing residuum from the drum while preventing recirculation of residuum through the coil, maintaining superatmospheric pressure through the coil and drum and continuously supplying charging stock to the process.

13. A process of oil conversion which comprises converting the oil under cracking temperature and superatmospheric pressure, condensing the heavier constituents of the evolved vapors, mixing the condensed constituents free of residual oil and while in heated condition and under mechanical pressure with the fresh charging oil, and heating and delivering the heated mixture to the cracking zone for conversion.

14. A process of oil conversion that comprises forcing a stream of oil under superatmospheric pressure once through an elongated heating zone of restricted cross-section, applying heat to the oil in transit therethrough to raise the oil to a cracking temperature, delivering the heated oil into an unheated enlarged zone where a substantially constant body of liquid oil is maintained under superatmospheric pressure and at a cracking temperature, discharging the residual oil produced in the process, removing the evolved vapors from said enlarged zone, separating out the heavier constituents thereof in the form of a hot condensate and returning said condensate while still hot and free of residual oil for retreatment by positively forcing it into the elongated heating zone against the back pressure developed therein and continuously supplying charging stock to the process.

15. The process of oil conversion that comprises maintaining a body of oil under superatmospheric pressure in a cracking chamber where a cracking temperature is maintained, by continuously forcing a stream of charging oil therein through an elongated heating coil wherein the oil is raised to a cracking temperature, the rate of heating the oil flowing through the heating coil being such as to avoid substantial deposition of carbon therein, separating out the heavier constituents of the evolved vapors and cyclically returning them for retreatment by positively forcing them under maintained mechanical pressure into the charging stream ahead of the heating coil and against the relatively high back pressure developed therein.

16. The process of oil conversion that comprises maintaining a body of oil in a chamber at a cracking temperature, continuously charging fresh oil therein at a rapid rate through an elongated charging line of restricted cross-section, maintaining superatmospheric pressure upon the oil in the chamber whereby a higher back pressure is developed in the elongated charging line by reason of the frictional resistance of the charging stream flowing therethrough, removing the evolved vapors from the cracking chamber, separating out the heavier constituents under substantially the pressure of the chamber and cyclically returning the separated condensate to the cracking chamber for retreatment by positively forcing it into the charging stream of fresh oil at a point in the charging line remote from the chamber and against the relatively high back pressure therein.

17. A process of oil conversion that comprises forcing a stream of charging oil under superatmospheric pressure through an elongated heating coil wherein the oil is brought in a single passage to a cracking temperature, delivering the highly heated oil into a body of oil in an enlarged drum maintained under superatmospheric pressure, where the evolution of vapors takes place and carbon resulting from the cracking operation is deposited, drawing off carbon residue from said drum, separating the heavier constituents of the evolved vapors and returning them for retreatment in said coil and drum by positively forcing them into the stream of charging oil ahead of said coil.

18. A process of converting heavy into lighter hydrocarbons, which comprises passing a stream of oil through a zone where said oil is heated to a cracking temperature, passing the oil thence to an enlarged unheated zone where conversion occurs, removing the vapors, subjecting them to reflux condensation, returning reflux condensate without permitting the same to intermingle with a bulk supply of charging stock under a mechanical pressure to the heating zone for further treatment, preventing an intermingling of any residue formed in the process with the oil in the heating zone, maintaining superatmospheric pressure on the material during conversion in said heating and conversion zones and continuously supplying charging stock to the process.

19. A process of converting heavy into lighter hydrocarbons, which comprises passing a stream of oil through a coil in a heating zone where said oil is heated to a cracking temperature, transferring the highly heated oil to an enlarged unheated zone where vaporization of a substantial portion thereof occurs, passing the vapors to a dephlegmator, introducing reflux condensate from said dephlegmator without permitting said condensate to intermingle with a bulk supply of charging stock to pressure applying means to be forced under pressure through the coil in the heating zone, removing the residue formed in the process without permitting intermingling of residue with the oil in the heating coil, maintaining superatmospheric pressure on said oil undergoing conversion and continuously supplying charging stock to the process.

20. A process for converting heavy into lighter hydrocarbons, which comprises passing a stream of oil in a coil through a heating zone where said oil is heated to a cracking temperature, transferring the highly heated oil to an enlarged unheated chamber where conversion thereof occurs, passing generated vapors to a reflux condenser, returning reflux condensate without being permitted to intermingle with a bulk supply of charging stock under a forced mechanical pressure to said heating coil, preventing a return of residual oil formed in the process to the heating coil, maintaining superatmospheric pressure on the oil undergoing conversion in said system, and continuously supplying charging stock to the process.

21. A process of converting relatively heavy into lighter hydrocarbons, which comprises passing a stream of oil through a coil in a heating zone where the oil is heated to a cracking temperature, passing the oil thence to an unheated zone where vaporization takes place, removing the vapors, subjecting them to reflux condensation, returning reflux condensate under maintained mechanical pressure to the heating zone for further cracking, removing the residue formed in the process from the system without permitting intermingling of residue with the oil in the heating zone, maintaining superatmospheric pressure on the material during treatment in said coil and chamber and continuously supplying charging stock to the process.

22. A process of converting heavy into lighter hydrocarbons, which comprises passing a stream of oil in a coil through a heating zone where the oil is heated to a cracking temperature and thence to a zone where distillation takes place, removing the vapors and passing them into a reflux condenser, returning reflux condensate free of residual oil under maintained mechanical pressure to said heating coil for further treatment therein, removing the residue formed in the process without permitting intermingling of any residue with the oil in the heating zone, and maintaining superatmospheric pressure on the oil undergoing distillation and condensation in said system and continuously supplying charging oil to the process.

23. A process of converting heavy into lighter hydrocarbons, which comprises passing a stream of oil in a coil through a zone where the oil is heated to a cracking temperature, and thence to a zone where vaporization takes place, removing the vapors and passing them into a reflux condenser, forcing both reflux condensate from said condenser under pressure and without material drop in temperature and charging stock under applied mechanical pressure in a stream through the heating coil, in removing the residue formed from the system without permitting intermingling of residue with the oil in the heating zone, in maintaining superatmospheric pressure on the oil undergoing vaporization and condensation in said system.

24. A process of converting relatively heavy into lighter hydrocarbons, which comprises passing a stream of charging oil through a coil in a heating zone where said oil is heated to a cracking temperature, passing the oil to an enlarged zone where conversion thereof occurs, introducing generated vapors to a reflux condenser, returning reflux condensate free of residual oil and mixed with charging stock under a forced mechanical pressure to said heating coil, in preventing the return of any liquid residual oil formed in the process to the heating coil, and maintaining superatmospheric pressure on the oil in said coil and said chamber.

25. A process of cracking oil, which comprises continuously passing a stream of oil through a heating coil where said oil is heated to a cracking temperature, delivering the oil to an enlarged unheated vapor chamber where vaporization takes place, removing vapors from said chamber and subjecting them to an initial condenser where portions of the vapors are condensed, subjecting the uncondensed portion of the vapors to final condensation, returning condensate from said initial condenser under applied mechanical pressure to the inlet side of said heating coil, continuously drawing off the residue formed in the process and preventing residue from returning to the heating coil and maintaining superatmospheric pressure on the oil in said heating coil, enlarged vapor chamber and initial condenser and supplying charging stock continuously to the process.

26. The process of converting hydrocarbon oil which comprises passing charging oil through a heating coil where it is raised to a cracking temperature, passing said heated oil into a body of oil in a cracking zone under superatmospheric pressure and maintained at a cracking temperature by the continual entrance therein of the stream of oil from the heating coil, removing from the cracking zone residuum and vapors formed, separating the less volatile constituents of the latter and intermingling them with the stream of charging oil entering the heating coil by forcing them therein under applied mechanical pressure, withdrawing from the circuit and condensing the lighter vapors formed, and preventing the return of residuum to the heating coil.

27. The process of converting hydrocarbon oil which comprises continuously forcing oil through a heating coil at a rapid rate of flow where it is heated to a cracking temperature, introducing it into a body of oil while in its heated condition to maintain said body of oil at a temperature sufficient for decomposition without depending upon the application of other heat thereto, removing the vapors formed, separating out the heavier vapors as a condensate, and continuously forcing it under maintained mechanical pressure into the heating coil, while maintaining a pressure of substantially 100 to 500 pounds throughout the system.

28. The process of converting hydrocarbon oil which comprises charging oil once through a heating coil where the oil acquires a high cracking temperature, continuously removing said oil from the coil and introducing it into a cracking zone where it is maintained at a somewhat lower cracking temperature and is subjected to decomposition, separating vapors from residual oil, separating out the heavier of said vapors as a condensate, continuously forcing it under maintained mechanical pressure into the charging oil and thence through the heating coil, and preventing the return of residual oil to said heating coil while maintaining superatmospheric pressure throughout the system.

29. A process of oil conversion that comprises charging oil at high speed through a coil into an enlarged drum, applying high temperature heat to the coil to raise the temperature of the oil so that it is delivered to the drum at a cracking temperature, maintaining a body of liquid oil under superatmospheric pressure and at a high temperature in said drum to effect distillation thereof, continuously withdrawing vapors from the drum, separating the kerosene-like constituents from the lighter vapors, returning the kerosene-like constituents by maintained applied mechanical pressure to the coil for passage therethrough with the charge, condensing the lighter vapors, and preventing the return of residual oil to said coil.

30. A process of oil conversion that comprises charging oil rapidly in a single passage through a highly heated coil where the oil attains a cracking temperature, and into a cracking zone where the oil is held at a cracking temperature without material rise and cracking effected, separating the lighter constituents by vaporization from the residual oil, passing the evolved vapors through a separator, forcibly returning the heavier constituents of said vapors without material drop in pressure and under mechanical pressure with the fresh charging oil into the coil, and preventing the return of residual oil to said coil.

31. The continuous method of cracking hydro-carbon oils which comprises forcing a stream of charging oil into a body of oil in a cracking still, maintaining the oil therein under superatmospheric pressure and at a cracking temperature, discharging the residual oil from the system while preventing the return of residual oil thereto, removing the evolved vapors, separating out the heavier constituents thereof and cyclically returning them to the still for further treatment by positively forcing them into the stream of charging oil being supplied to the still.

32. The process of oil conversion that comprises maintaining a body of oil in a chamber at a cracking temperature, continuously charging fresh oil therein at a rapid rate through an elongated charging line of restricted cross-section, maintaining superatmospheric pressure upon the oil in the chamber whereby a higher back pressure is developed in the elongated charging line by reason of the frictional resistance of the charging stream flowing therethrough, removing the evolved vapors from the cracking chamber, separating out the heavier constituents under substantially the pressure of the chamber and cyclically returning the separated condensate to the cracking chamber for retreatment by positively forcing it into the charging stream of fresh oil at a point in the charging line remote from the chamber and against the relatively high back pressure therein, and withdrawing residual oil from said chamber while preventing the return of any residual oil thereto.

33. A process of oil conversion that comprises forcing a stream of oil under superatmospheric pressure through an elongated heating coil wherein the oil is brought in a single passage to a cracking temperature, delivering the highly heated oil into a substantially constant body of oil in an unheated enlarged drum maintained under superatmospheric pressure, where the evolution of vapors takes place and carbon resulting from the cracking operation is deposited, separating the heavier constituents of the evolved vapors, returning them free of residual oil for retreatment in said coil and drum by positively forcing them under maintained mechanical pressure into said heating coil, and continuously supplying charging oil to the process.

34. A process of converting heavy into lighter hydrocarbons, which comprises passing a stream of hydrocarbon oil through a zone where said oil is heated to a cracking temperature, passing the oil thence to a zone maintained at substantially the temperature of the entering oil and where conversion occurs, separating the vapors from the residue, subjecting the vapors to reflux condensation, returning reflux condensate under maintained mechanical pressure to the heating zone for further treatment, discharging the residue formed in the process while preventing an intermingling of residue with the oil in the heating zone, maintaining superatmospheric pressure on the material during its passage through said heating and conversion zones and supplying charging oil continuously to the process.

35. A process of converting heavy into lighter hydrocarbons, which comprises passing a stream of oil through a coil in a heating zone where said oil is heated to a cracking temperature, transferring the highly heated oil into a body of oil in an unheated zone where vaporization of a substantial portion thereof occurs, passing the vapors to a dephlegmator, introducing reflux condensate from said dephlegmator, while still under pressure to pressure applying means to be forced under maintained mechanical pressure through the coil in the heating zone, removing the residue from the system without permitting intermingling of residue with the oil in the heating coil, maintaining superatmospheric pressure on said oil throughout the system and continuously supplying charging stock to the process.

36. A process of converting heavy into lighter hydrocarbons, which comprises charging a stream of oil through a heating coil where the oil is heated to a cracking temperature and thence to a zone where distillation takes place, passing the evolved vapors into a reflux condenser, returning reflux condensate under maintained mechanical pressure with said charging stream to said heating coil for further treatment therein, preventing intermingling of residual oil with the oil in the heating zone and maintaining superatmospheric pressure on the oil undergoing conversion, distillation and condensation in said system.

37. A process of converting heavy into lighter hydrocarbons, which comprises forcing a stream of charging oil through a coil in a zone where the oil is heated to a cracking temperature, and thence to an enlarged zone where vaporization takes place, removing the vapors and passing them into a reflux condenser, forcing hot reflux condensate while under maintained applied mechanical pressure into the stream of charging stock and thence through the heating coil, preventing intermingling of residual oil with the oil in the heating zone, and maintaining super-atmospheric pressure on the oil undergoing heating and vaporization in said system.

38. A process of converting relatively heavy into lighter hydrocarbons, which comprises charging a stream of oil through a coil in a heating zone where said oil is heated to a cracking temperature, passing the oil to a zone maintained at a cracking temperature where conversion thereof occurs, separating the lighter products from the residual oil by vaporization, introducing generated vapors to a reflux condenser, returning reflux condensate mixed with charging stock under a forced mechanical pressure to said heating coil, preventing the return of residual oil to the heating coil, and maintaining superatmospheric pressure on the oil undergoing conversion in said system.

39. A process of cracking oil which comprises subjecting oil in a fired heating zone to a cracking temperature solely by the application of external heat, delivering the highly heated oil into a heat insulated zone where separation of vapors from residual oil takes place, discharging the residual oil, subjecting separated vapors to partial condensation to separate out the heavier constituents thereof as a condensate, removing uncondensed vapors and positively returning condensate unmixed with residual oil by maintained mechanically applied pressure to the heating zone for further treatment and continuously supplying charging stock to the process.

40. A process of cracking oil which comprises passing oil in a stream under superatmospheric pressure through a heating coil where it is heated in transit solely by external heat to a cracking temperature, conducting the highly heated oil into an enlarged heat insulated vapor separating zone maintained under pressure and where distillation of the lighter products from the residual oil takes place, removing the vapors therefrom for condensation of the heavier constituents under superatmospheric pressure into a liquid condensate, removing the vaporized lighter constituents and compelling the positive forcible return of condensate unmixed with residual oil through the heating coil by maintained mechanically applied pressure and supplying charging stock continuously to the process.

41. A process of oil conversion which comprises heating the oil under superatmospheric pressure in a heating coil to a cracking temperature in a single passage therethrough, delivering the heated oil into a cracking zone maintained under superatmospheric pressure, moderately heating the oil in said cracking zone to substantially maintain the cracking temperature and effect cracking of the oil therein, separating the cracked vapors from the residual oil and forming a condensate of the heavier constituents thereof, collecting the lighter constituents as a distillate, forcibly returning the condensate while in heated condition and under maintained mechanical pressure to the heating coil for further treatment, discharging the residual oil formed in the process, while preventing recirculation of residual oil through the heating coil, and continuously supplying charging stock to the process.

42. A process of cracking oil which comprises forcing a stream of charging oil under superatmospheric pressure through a heating coil where it is raised in single passage to a cracking temperature, delivering the heated oil into an enlarged zone where vaporization takes place under superatmospheric pressure, removing the evolved vapors and producing a condensate of the heavier constituents thereof, injecting a stream of condensate into the stream of charging oil by jet action, and preventing recirculation of residual oil formed in the process to the heating coil.

43. A process of oil conversion which comprises passing oil under superatmospheric pressure through a heating coil, raising the oil in single transit through said coil to a cracking temperature but removing the oil from the heating coil in a state of incipient cracking but before substantial cracking is effected, passing the heated oil free from residue into an enlarged cracking zone where it is maintained under superatmospheric pressure and at a cracking temperature for a sufficient time to effect material cracking thereof, separating the light cracked products from the residual oil by vaporization in said enlarged zone, discharging residual oil from the system, dephlegmating the vapors under superatmospheric pressure to separate out a condensate of the heavier constituents thereof, returning the hot condensate without release of pressure thereon by maintained forced mechanical pressure to the heating coil for retreatment, without permitting intermingling of residual oil with the oil in said heating coil and continuously supplying charging stock to the process.

44. A process of oil conversion which comprises forcing a stream of charging oil rapidly and under superatmospheric pressure once through a heating coil where it is raised to a cracking temperature but without substantial cracking therein, delivering the oil to a cracking zone where superatmospheric pressure and a cracking temperature is maintained and material cracking of the oil effected, discharging the residual oil formed in the process without permitting the return of any residual oil to the heating coil, producing a condensate of the heavier constituents of the vapors evolved in said cracking zone, and cyclically returning condensate while still hot under applied mechanical pressure to the heating coil for retreatment in said coil and said cracking zone in commingled relation with the charging stream.

In witness whereof I have hereunto set my hand this 2d day of April 1923.

OTTO BEHIMER.